United States Patent [19]
Davis et al.

[11] Patent Number: 5,451,954
[45] Date of Patent: Sep. 19, 1995

[54] QUANTIZATION NOISE SUPPRESSION FOR ENCODER/DECODER SYSTEM

[75] Inventors: Mark F. Davis, Pacifica; Craig C. Todd, Mill Valley; Grant A. Davidson, Oakland; Stephen D. Vernon, San Francisco, all of Calif.

[73] Assignee: Dolby Laboratories Licensing Corporation, San Francisco, Calif.

[21] Appl. No.: 101,887

[22] Filed: Aug. 4, 1993

[51] Int. Cl.⁶ .............................................. H03M 7/00
[52] U.S. Cl. ................................................... 341/200
[58] Field of Search ............... 341/200, 144, 155, 61; 381/29, 31, 34, 36

[56] References Cited

U.S. PATENT DOCUMENTS 4,464,783 8/1984 Beraud et al.
5,109,417 4/1992 Fielder et al. ..................... 381/36

FOREIGN PATENT DOCUMENTS 0193143 9/1986 European Pat. Off.
0251028 1/1988 European Pat. Off.
0446031 9/1991 European Pat. Off.
8911759 11/1989 WIPO .
9217884 10/1992 WIPO .

OTHER PUBLICATIONS

Schroeder, et al., "MSC: Stereo Audio Coding with CD-quality and 256 kBit/sec", *IEEE Tran. Consumer Elec.*, Nov. 1987, pp. 512–519.
Brandenburg, "High Quality Sound Coding at 2.5 Bit/Sample," *AES Convention*, Apr. 1988, preprint 2582.

*Primary Examiner*—Brian K. Young
*Attorney, Agent, or Firm*—Thomas A. Gallagher; David N. Lathrop

[57] ABSTRACT

The invention relates in general to low bit-rate encoding and decoding of information such as audio information. More particularly, the invention relates to the suppression of quantizing noise which results from low bit-rate encoding and decoding of signal events such as transients. An encoder identifies intervals of an input signal in which a decoder is likely to generate audible artifacts caused by quantizing errors. Indications of these intervals are passed in the encoded signal to the decoder. The decoder uses these indications to eliminate quantizing artifacts by suppressing corresponding intervals in the output signal.

23 Claims, 5 Drawing Sheets

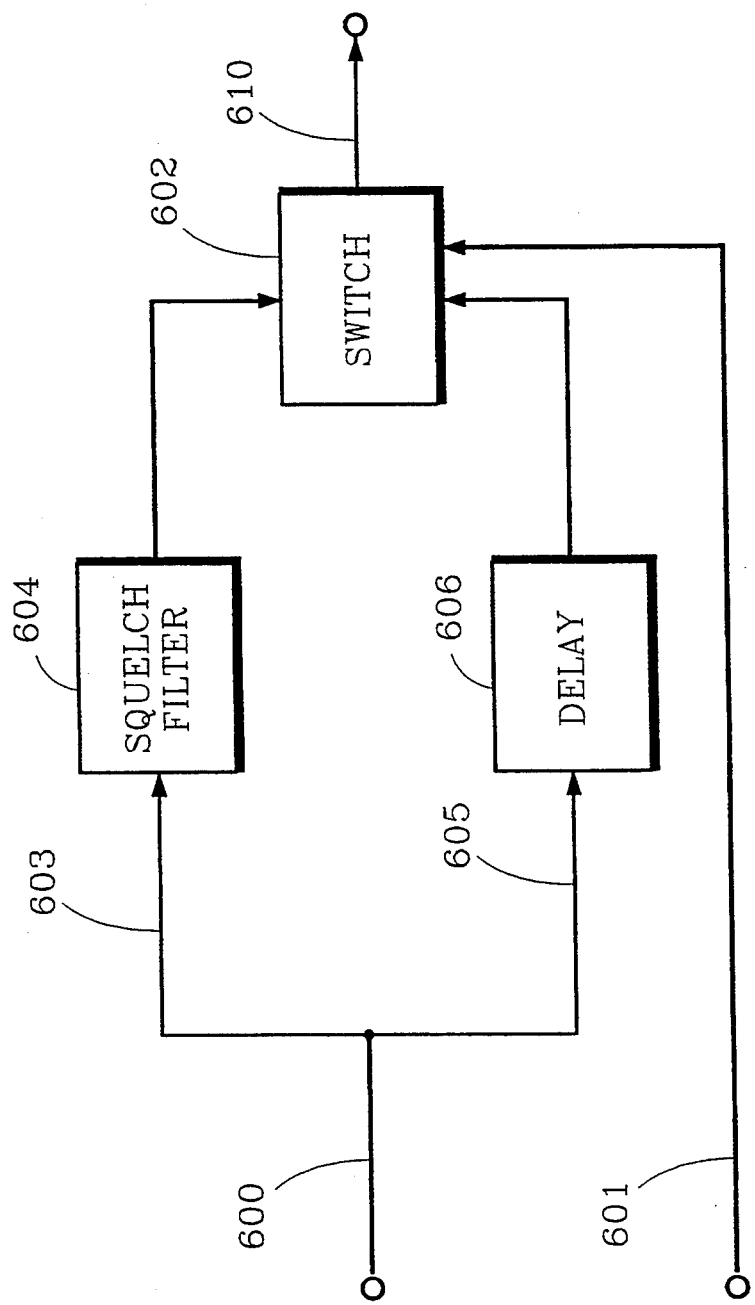

QUANTIZATION NOISE SUPPRESSION FOR ENCODER/DECODER SYSTEM

TECHNICAL FIELD

The present invention relates in general to high-quality low bit-rate digital encoding and decoding of information representing stimuli intended for human perception such as audio or video information. More particularly, the present invention relates to the suppression of quantizing noise which results from low bit-rate encoding and decoding of a transient-like event in an input signal.

BACKGROUND ART

There is considerable interest among those in the fields of audio- and video-signal processing to minimize the amount of information required to represent a signal without perceptible loss in signal quality. By reducing information requirements, signals impose lower information capacity requirements upon communication channels and storage media; however, there are limits to the reduction in information requirements which can be realized without degrading the perceived signal quality.

Digital signals encoded with fewer bits impose lower information capacity requirements, but decreasing the number of bits used to quantize information increases the quantizing inaccuracies or quantizing errors. In many applications, quantizing errors are manifested as quantizing noise. If the errors are large enough, the noise will be perceptible and degrade the perceived quality of the encoded signal.

Various "split-band" coding techniques attempt to reduce information requirements without producing any perceptible degradation by exploiting various psycho-perceptual effects. In audio applications, for example, the human auditory system displays frequency-analysis properties resembling those of highly asymmetrical tuned filters having variable center frequencies and bandwidths which vary as a function of the center frequency. The ability of the human auditory system to detect distinct tones generally increases as the difference in frequency between the tones increases; however, the resolving ability of the human auditory system remains substantially constant for frequency differences less than the bandwidth of the above mentioned filters. As a result, the frequency-resolving ability of the human auditory system varies according to the bandwidth of these filters throughout the audio spectrum. Frequency bands having a bandwidth commensurate with the bandwidths of these auditory filters are referred to as "critical bands" and the widths of these bands are referred to as "critical bandwidths." A dominant signal within a critical band is more likely to mask the audibility of other signals anywhere within that critical band than it is likely to mask other signals at frequencies outside that critical band.

A dominant signal may mask other signals which occur not only at the same time as the masking signal, but also which occur before and after the masking signal. The duration of pre- and postmasking effects within a critical band depend upon the magnitude of the masking signal, but premasking effects are usually of much shorter duration than postmasking effects. See generally, the *Audio Engineering Handbook*, K. Blair Benson ed., McGraw-Hill, San Francisco, 1988, pages 1.40–1.42 and 4.8–4.10.

In audio applications, for example, split-band coding techniques which divide the useful signal bandwidth into frequency bands with bandwidths approximating the critical bandwidths of the human auditory system can better exploit psychoacoustic effects than wider band techniques. Such digital split-band coding techniques comprise dividing an input signal into "subbands," quantizing the signal passed by each subband filter using just enough bits to render quantizing noise inaudible, and reconstructing a replica of the original signal. Two such techniques are subband coding and transform coding. Without degrading the subjective quality of the encoded signal, subband and transform coding can reduce transmitted information requirements in particular frequency subbands where the resulting quantizing noise is psychoacoustically masked by neighboring spectral components.

Subband coders may incorporate a filter bank implemented by any of a variety of techniques including Finite Impulse Response (FIR) filters, Infinite Impulse Response (IIR) filters, and discrete transforms. In such coders, an input signal comprising signal samples is passed through a bank of digital bandpass filters and each "subband signal" passed by a respective bandpass filter in the filter bank is downsampled according to the bandwidth of that subband's filter. Each subband signal comprises samples which represent a portion of the input signal spectrum.

Transform coders may implement a bank of digital filters with so-called time-domain to frequency-domain transforms such as the Discrete Fourier Transform (DFT), Discrete Cosine Transform (DCT), and Discrete Hadamard Transform (DHT). In such coders, an input signal comprising signal samples is segmented into "signal sample blocks" prior to transformation. Each coefficient obtained from the transform represents a portion of the input signal spectrum for a respective signal sample block. Individual coefficients, or two or more adjacent coefficients grouped together, define "subbands" having effective bandwidths which are sums of individual coefficient bandwidths.

Throughout the following discussion, the term "split-band coder" shall refer to subband coders, transform coders, and other coding techniques which operate upon portions of the useful signal bandwidth. The term "subband" shall refer to these portions of the useful signal bandwidth, whether implemented by a true subband coder, a transform coder, or other split-band technique.

The term "signal sample block" shall refer to a group or block of signal samples within a given interval of time. The term pertains to transform coders having block transforms which operate upon blocks of signal samples, and it also pertains to other split-band coders such as subband coders which segment samples into blocks to facilitate various block coding methods.

The term "subband information" shall refer to the split-band filtered representation of the spectral energy in one or more subbands. The term "subband information block" shall refer to the subband information for all subbands across the useful signal bandwidth for a given signal sample block. For subband coders implemented by a digital filter bank, a subband information block comprises the set of samples for all subband signals over a given time interval. For transform coders, a subband information block comprises the set of all transform coefficients corresponding to a signal sample block.

For ease of discussion, more particular mention is made of audio coding throughout this disclosure but the principles, problems and solutions apply generally to other coding applications such as video coding.

In concept, many split-band audio coders utilizing psychoacoustic masking effects provide high-quality coding at low bit rates by applying a filter bank to an input signal to generate subband information, quantizing each element of subband information using a number of bits allocated to that element such that resulting quantizing noise is inaudible due to various psychoacoustic masking effects, and assembling the quantized information into a form suitable for transmission or storage.

A complementary split-band decoder recovers a replica of the original input signal by extracting quantized information from an encoded signal, dequantizing the quantized information to obtain subband information, and applying an inverse filter bank to the subband information to generate the replica of the original input signal.

The ability of a split-band coding system to exploit psychoacoustic masking effects depends upon the selectivity of bandpass filters in the filter banks implemented in the encoder and decoder. Filter "selectivity," as that term is used here, refers to two characteristics of subband bandpass filters. The first is the bandwidth of the regions between the filter passband and stopbands (the width of the transition bands). The second is the attenuation level in the stopbands. Thus, filter selectivity refers to the steepness of the filter response curve within the transition bands (steepness of transition band roll-off), and the level of attenuation in the stopbands (depth of stopband rejection).

Filter selectivity is directly affected by numerous factors including filter temporal resolution. In a general sense, filter selectivity or frequency resolution increases as filter temporal resolution decreases. The temporal resolution of an IIR filter is inversely related to the filter's time constant. The temporal resolution of FIR filters and discrete transforms is inversely related to the filter and transform length. The length of an FIR filter is determined by the number of filter taps or filter coefficients. The length of a transform-based filter is defined herein to be the "signal sample block length" or the number of samples in a block of samples which are transformed together into a subband information block. With other factors constant, as filter length increases, temporal resolution decreases and frequency selectivity increases.

It is common for the number of coefficients generated by a transform filter bank, or the "transform length," to be equal to the signal sample block length, but this is not necessary. For example, the overlapping-block transform used in one embodiment of the present invention discussed more fully below is sometimes described in the art as a transform of length N that transforms signal sample blocks with 2N samples. But this transform can also be described as a transform of length 2N which generates only N unique coefficients. Because all the transforms discussed herein can be thought to have lengths equal to the signal sample block length, the two lengths are used as synonyms for one another.

On the one hand, it is desirable for encoders to use filter banks with longer filters because higher frequency selectivity reduces the amount of energy which leaks from one bandpass filter band into another. By reducing leakage within the filter bank, encoders can more accurately measure the spectral shape of an input signal, can make more accurate bit allocation decisions, and can more reliably render quantization inaudible within the constraints of a given bit rate.

On the other hand, it desirable for encoders to use shorter filters because higher temporal resolution decreases the time interval over which quantization errors are spread. For example, quantization errors will cause a transform encoder/decoder system to "smear" the frequency components of a sampled signal across the full length of the signal sample block. Distortion artifacts in the signal recovered by the decoder may be audible for large changes in signal amplitude which occur during a short time interval. Such amplitude changes are referred to here as "transients." These artifacts, which can occur in both transform and true subband coding systems, manifest themselves as pre- and post-transient ringing. If filter temporal resolution is sufficiently high, such artifacts can be confined to the pre-masking and post-masking intervals of the transient, thereby increasing the likelihood that they will be masked by the transient itself.

Coding systems which used fixed-length filters must use a compromise length which trades off a priori temporal resolution against frequency resolution. A short length will degrade subband filter selectivity. A long length may improve filter selectivity but will reduce temporal resolution, which may result in coding artifacts which are audible because they occur outside the temporal psychoacoustic masking interval of the human auditory system.

A transform coding method disclosed in European Patent Office publication EP 0 251 028 attempts to eliminate pre-transient artifacts by effectively eliminating the transient. The encoding method high-pass filters an input signal to improve transient detection, boosts the amplitude of signal samples in a signal sample block prior to a transient, applies a transform to the modified signal sample block and quantizes the resulting transform coefficients. The position of the transient is passed as side information to the receiver/decoder which applies an inverse transform to the received transform coefficients and attenuates recovered signal samples in a signal sample block prior to a transient by a corresponding amount.

This coding method has several disadvantages, two of which are mentioned here. First, the pre-transient boost distorts the spectral shape of the sample block and thereby distorts coding decisions based on this spectral shape. This adversely affects the ability to exploit psychoacoustic masking. Furthermore, in coders adaptively allocating a limited number of bits, the boost of pre-transient signal samples tends to increase quantizing errors of the transient. This increase in quantizing error results from the boost amplifying spectral components other than those of the transient. Adaptive bit allocation based upon psychoacoustic principles will allocate more bits to these amplified spectral components than would otherwise be allocated without boost. This reduces the number of bits remaining to encode the transient's spectral components; therefore, transient quantizing noise may increase.

Second, large-amplitude signal samples that are amplified by the pre-transient boost may exceed the encoder's capacity to represent them (exceed the encoder's dynamic range). If the encoder's dynamic range is increased to handle the amplified components, the number of bits required to encode the signal also increases.

This condition is more likely for large-amplitude low-frequency spectral components. Because they are low in frequency, these large-amplitude components will be blocked by the high-pass filter and will not inform the transient detection process. The EP 0 251 028 publication suggests applying a frequency selective boost, boosting only those spectral components which make up the transient; however, this requires more processing to perform one or more additional filtering steps over that needed to perform the transform because the pre-transient boost occurs in the time-domain prior to transform filtering.

Another transform coding method, described in WIPO publication WO 91/16769, reduces the signal sample block length and adapts the transform function in response input signal transients. Although this method avoids the problems recited above, it requires a significant amount of processing. As a result, the cost of implementation may be too high for many applications.

DISCLOSURE OF INVENTION

It is an object of the present invention to provide for the suppression of quantization noise in an encoder/decoder system which results from low bit-rate coding of a transient-like event occurring in an input signal.

It is a further object of the present invention to provide for such an encoder/decoder system which may be implemented at low cost.

Further details of the above objects and still other objects of the invention are set forth below.

In accordance with the teachings of the present invention in one embodiment, an audio encoder receives digital audio signal samples and evaluates a high-pass filtered representation of the signal samples to determine if a significant signal transient is present. If such a transient is present, the encoder generates side information which indicates one or more intervals in which samples are to be suppressed by a decoder. The encoder generates subband information by applying a filter bank to the signal samples and then quantizes the subband information according to psychoacoustic principles. The quantized subband information and the side information are subsequently passed to a decoder.

The use of a high-pass filter generally improves the reliability of transient detection; however, high-pass filtering is not required to practice the present invention. A band-pass filter is preferred in some applications.

In accordance with the teachings of the present invention in one embodiment, an audio decoder receives encoded signals prepared by an encoder incorporating aspects of the present invention. The decoder extracts from the encoded signal quantized subband information and side information possibly indicating one or more intervals in which samples are to be suppressed. The decoder generates sample blocks by applying an inverse filter bank to the subband information recovered from the encoded signal. In response to the side information, the decoder may suppress one or more samples generated by the inverse filter bank.

In specific embodiments of an encoder, the signal samples are grouped into signal sample blocks which are further segmented into subblocks. The peak amplitude within each subblock is compared with the peak amplitude of the following subblock. If the change between peak amplitudes of adjacent subblocks exceeds a "transient threshold" indicating the presence of a transient, then an indication of one or more subblocks near the transient is included in the side information. The size of the subblocks may be of any convenient length, including a length of one.

In other embodiments, a measure of sample amplitude other than peak amplitude may be used. For example, the root-mean-square (RMS) of all or the three largest samples in a subblock may be used as a measure of amplitude. In the remaining discussion, references to "peak amplitude" and the like should be understood to exemplify only one specific measure of amplitude, and that other measures are possible.

It should be noted that the term "transient" refers to a broader class of events than just large abrupt changes in amplitude. For example, "transient" also refers to constant amplitude spectral components with large abrupt changes in frequency. Such transients can be made to appear as abrupt changes in amplitude, however, by examining the spectral energy in narrow frequency bands.

For ease of discussion, the following is directed more particularly toward embodiments which work with "subblocks" and "peak amplitudes" of subblocks. Unless it is made clear to the contrary, the terms "subblocks" and "peak amplitudes" correspond to individual samples and to amplitudes of individual samples, respectively. For example, comparing peak amplitudes in two adjacent subblocks conceptually corresponds to comparing the amplitudes of two adjacent samples; suppressing one or more subblocks conceptually corresponds to the suppression of one or more samples.

In some embodiments, one or more subblocks may be suppressed in response to sufficiently large increases and decreases in peak amplitudes. In other embodiments, suppression may occur in response to only sufficiently large increases in peak amplitudes.

In some embodiments, only selected subblocks preceding a transient are suppressed. More particularly, stepping backward in time from a transient, "small-amplitude" subblocks having a peak amplitude below a "small-amplitude threshold" are suppressed until encountering either the beginning of the signal sample block or a subblock having a peak amplitude which is not below the threshold. In some embodiments, the small-amplitude threshold is constant. In preferred embodiments, the small-amplitude threshold is highest at the transient and decreases as a function of distance from the transient.

In other embodiments, a measure of sample amplitude other than peak amplitude may be used. In the same manner as that discussed above for detecting transient, references to "peak amplitude" and the like should be understood to exemplify only one specific measure of amplitude, and that other measures are possible.

Many variations are possible. For example, suppression of subblocks may be indicated for (1) all small-amplitude subblocks within a sample block which precede a transient, (2) all small-amplitude subblocks within a sample block which precede and follow a transient, (3) selected small-amplitude subblocks preceding and/or following only the largest transient in a sample block, or (4) selected small-amplitude subblocks preceding and/or following all transients in a sample block. These examples do not represent an exhaustive list.

In specific embodiments of a decoder, many variations are possible. For example, suppression of a subblock may be accomplished by resetting the samples in the subblock to some predefined value such as zero, by reducing the amplitude of the samples by a fixed or variable amount, or by passing the samples through a low-pass filter. These variations represent choices of implementation and are not critical to the practice of the present invention.

The various features of the present invention and its preferred embodiments may be better understood by referring to the following discussion and the accompanying drawings. The contents of the following discussion and the drawings are set forth as examples only and should not be understood to represent limitations upon the present invention.

BRIEF DESCRIPTION OF DRAWINGS

FIG. 6 is a functional block diagram of one embodiment of a squelch filter.

MODES FOR CARRYING OUT THE INVENTION

Overview

Figure 1:
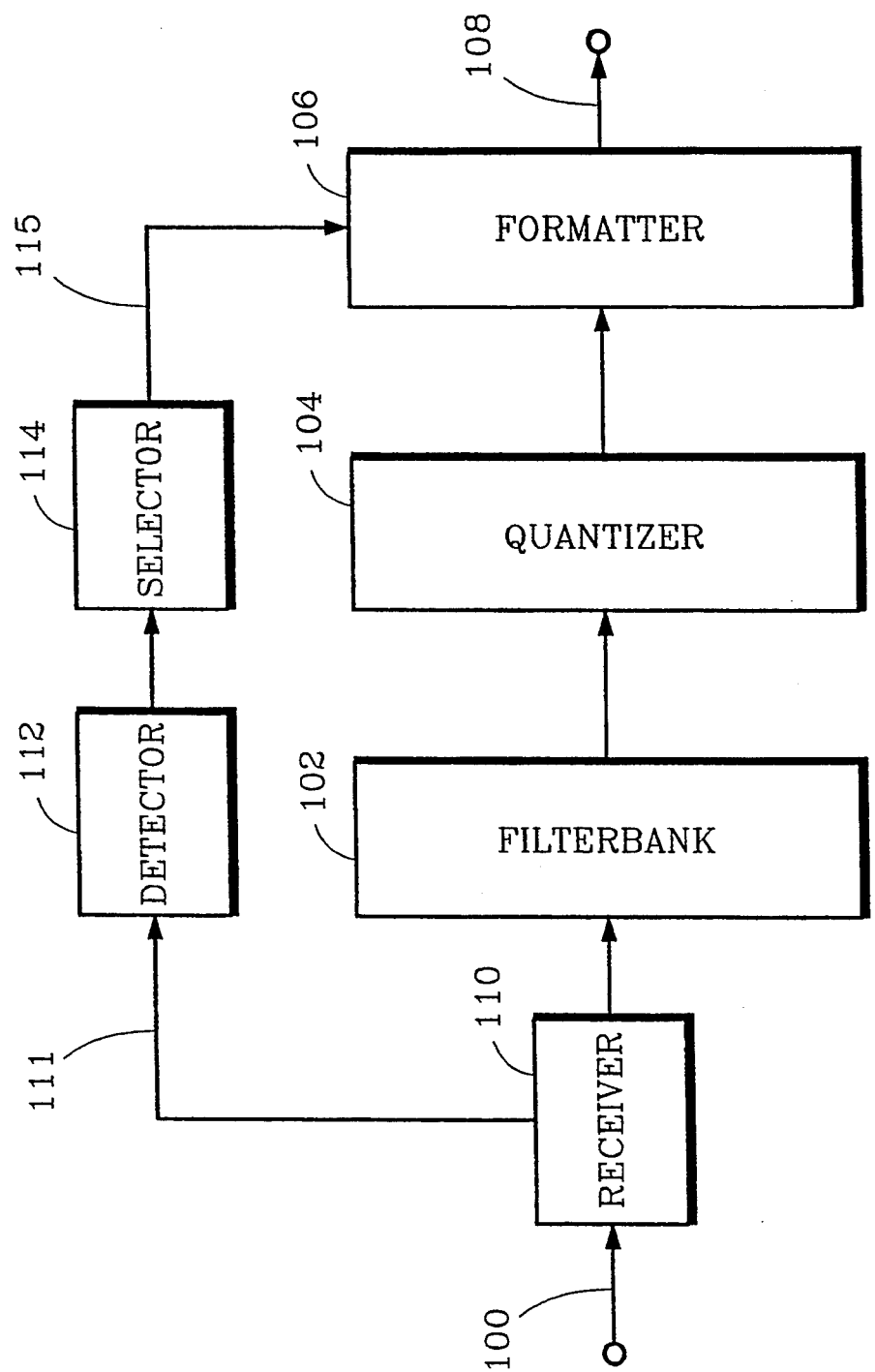
FIG. 1 is a functional block diagram of one embodiment of an encoder incorporating aspects of the present invention.

The basic structure of one embodiment of a split-band encoder incorporating the present invention is illustrated in FIG. 1. Receiver 110 receives from path 100 an input signal comprising signal samples, passes the input signal to filterbank 102 and generates an auxiliary signal corresponding to the input signal which it passes along path 111 to detector 112. Filterbank 102 generates subband information in response to the input signal which it passes to quantizer 104. Quantizer 104 quantizes the subband information, using a number of bits adaptively allocated in accordance with certain psycho-perceptual principles. In audio encoders, for example, bits may be allocated in accordance with psychoacoustic masking effects. In video encoders, for example, bits may be allocated in accordance with psychovisual masking effects. Detector 112 analyzes the auxiliary signal received from path 111 to detect the occurrence of transients such as abrupt changes in signal amplitude. In response to detected transients, selector 114 generates side information along path 115 which indicates which of one or more signal samples in proximity to a transient is to be suppressed by a decoder. Formatter 106 assembles the quantized subband information and the side information into a form suitable for transmission or storage, which it passes along path 108.

Figure 2:
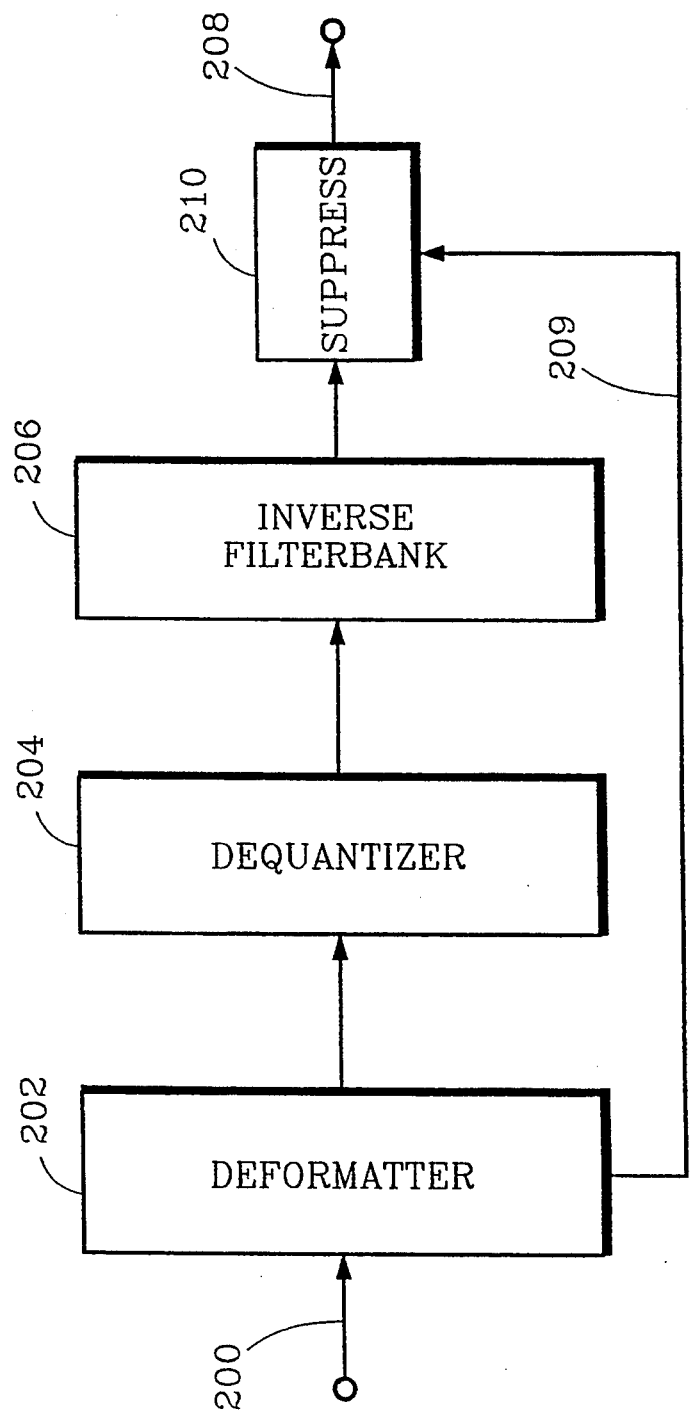
FIG. 2 is a functional block diagram of one embodiment of a decoder incorporating aspects of the present invention.

The basic structure of one embodiment of a split-band decoder incorporating the present invention is illustrated in FIG. 2. Deformatter 202 receives an encoded signal from path 200 and extracts from the encoded signal quantized information, which it passes to dequantizer 204, and side information, which it passes along path 209 to suppressor 210. Dequantizer 204 recovers subband information by dequantizing the quantized information, and which it passes to inverse filterbank 206. Inverse filterbank 206 recovers signal samples in response to the recovered subband information, which it passes to suppressor 210. Suppressor 210 receives recovered signal samples from inverse filterbank 206, suppresses selected ones of the recovered signal samples according to the side information received from path 209, and passes the resulting signal along path 208.

The technique used to implement filterbank 102 and inverse filterbank 206 is not critical to the practice of the present invention. As mentioned above, a wide variety of digital filters and transforms may be used. In various embodiments discussed below, the filter banks are implemented according to the Time-Domain Aliasing Cancellation (TDAC) transform described by Princen and Bradley, "Analysis/Synthesis Filter Bank Design Based on Time Domain Aliasing Cancellation," IEEE Trans. on Acoust., Speech, Signal Proc., vol. ASSP-34, 1986, pp. 1153–1161.

The specific implementations of quantizer 104, dequantizer 204 and the associated adaptive bit allocation processes are not critical to the practice of the present invention. Bits may be allocated in the encoder according to any criteria including, but not limited to, psycho-perceptual effects such as psychoacoustic masking. The bit allocation decisions may be communicated to the decoder expressly in side information (forward-adaptive techniques) and/or implicitly in the coded signal itself (backward-adaptive techniques).

It should also be apparent that no particular format of the encoded signal is required to practice the present invention; therefore, the implementations of formatter 106 and deformatter 202 are not critical.

In order to simplify the following discussion, various aspects of the present invention will be explained within the context of a particular embodiment of an audio encoder/decoder system. This embodiment, and several variations thereof, are offered only as examples and should not be construed as a limitation upon the present invention. It should be understood that this discussion and the accompanying drawings do not include many features which may be important in practical embodiments of encoder/decoder systems. For example, no mention is made of low-pass filters which are sometimes used to limit the bandwidth of the input signal to an encoder and/or the output signal from a decoder. Some additional details pertaining to a practical implementation of an encoder/decoder system may be obtained by referring to U.S. Pat. No. 5,109,417, which is incorporated herein by reference in its entirety.

In the following discussion of this embodiment, it is assumed that the filter banks are implemented using the TDAC transform of Princen and Bradley. The input signal represents a 20 kHz bandwidth-limited audio signal sampled at a rate of 48 kHz. The transform length and the signal sample block length are fixed at 512 samples.

Auxiliary Signal

Receiver 110 generates an auxiliary signal by applying a high-pass filter to the input signal. Filtering is not required to practice the invention. If filtering is not used, the auxiliary signal can be a replica of the input signal.

High-pass filtering is generally desirable in speech and music coding applications, however, because most speech and music energy is in the low-frequency components. The high-frequency components of transients can be difficult to detect unless the low-frequency components are removed from the transient detection process.

The highest-frequency components may also be removed or attenuated in the transient detection process because they are usually difficult to hear. It is rarely necessary or desirable to suppress pre-transient and post-transient artifacts produced by quantizing errors in the highest frequencies because they are generally inaudible.

In one embodiment, a three-pole high-pass IIR filter provides a rolloff of 18 dB per octave below a cutoff frequency $f_1$ of 2 kHz. This embodiment may also include a one-pole low-pass IIR filter which provides a rolloff of 6 dB per octave above a cutoff frequency $f_2$ of 8 kHz. IIR filters are chosen because the required computations are reasonably efficient.

These two filters may be implemented as a cascade of two second-order filters. The difference equations and the equivalent transfer function for these two filters are $$w_n = a_{01}x_n + a_{11}x_{n-1} + a_{21}x_{n-2} - b_{11}w_{n-1} - b_{21}w_{n-2} \quad (1)$$

$$y_n = a_{02}w_n + a_{12}w_{n-1} + a_{22}w_{n-2} - b_{12}y_{n-1} - b_{22}y_{n-2} \quad (2)$$

$$H(z) = \left[ \frac{a_{01} + a_{11}z^{-1} + a_{21}z^{-2}}{1 + b_{11}z^{-1} + b_{21}z^{-2}} \right] \left[ \frac{a_{02} + a_{12}z^{-1} + a_{22}z^{-2}}{1 + b_{12}z^{-1} + b_{22}z^{-2}} \right] \quad (3)$$

where the coefficients $a_{ij}$ and $b_{ij}$ are as follows:

|          | j = 1   | j = 2   |
|----------|---------|---------|
| $a_{0j}$ | 0.25    | 0.5     |
| $a_{1j}$ | −0.5    | −0.5    |
| $a_{2j}$ | 0.25    | 0.0     |
| $b_{1j}$ | −1.729  | −1.201  |
| $b_{2j}$ | 0.7855  | 0.3692  |

The amount of rolloff and the cutoff frequencies for the two filters are not critical. Frequency $f_1$ and the rate of rolloff below this frequency should be selected such that low-frequency spectral components do not obscure transients. Frequency $f_2$ and the rate of rolloff above this frequency should be selected to achieve a proper balance between the audibility of effects caused by the suppression process and the audibility of high-frequency quantizing artifacts.

Transient Detection

1. Subblocks

Figure 3:
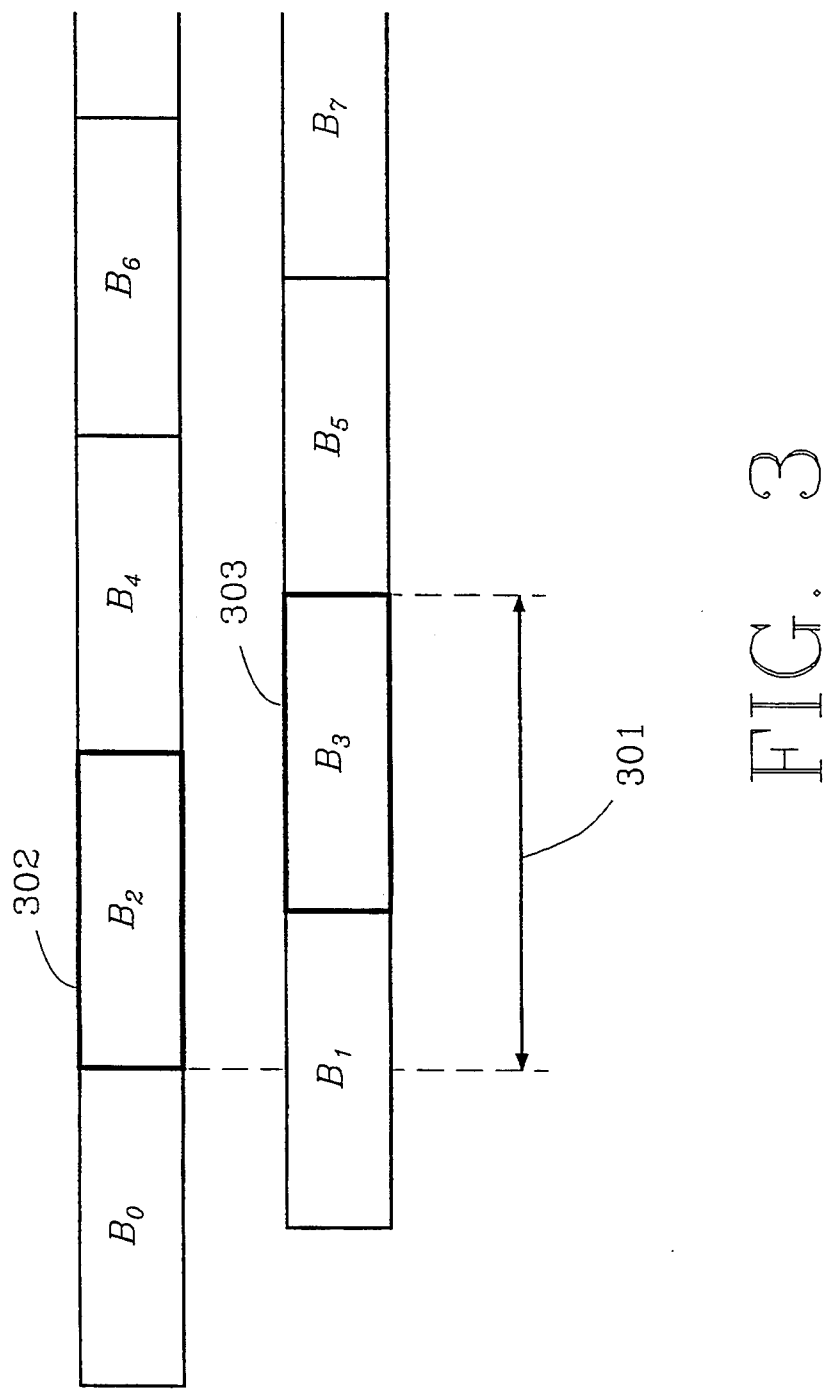
FIG. 3 is a hypothetical diagram of blocks illustrating the boundaries of signal sample blocks processed by a transform-based filter bank in one embodiment of an encoder.

The TDAC transform used to implement the encoder filterbank comprises an alternate application of a modified Discrete Cosine Transform (DCT) and a modified Discrete Sine Transform (DST) to blocks of 512 samples which overlap each other by 256 samples. Referring to FIG. 3, each block $B_i$ along the top row represents the boundaries of a signal sample block transformed by the DCT and each block $B_i$ along the bottom row represents the boundaries of a signal sample block transformed by the DST. Throughout the following discussion, the set of transform coefficients which are generated by the DCT and the DST in response to the signal samples in block $B_i$ are denoted $DCT_i$ and $DST_i$, respectively. Referring to FIG. 3, it may be seen that the index i is even for DCT blocks and odd for DST blocks. For example, signal sample block $B_0$ is transformed by the DCT into transform block $DCT_0$ and signal sample block $B_1$ is transformed by the DST into transform block $DST_1$.

In one embodiment, the transform coefficients obtained in response to an overlapping pair of sample blocks are quantized together. For example, the coefficients in blocks $DCT_2$ and $DST_3$ are quantized together. The transform coefficients from each block pair are represented in block-floating-point (BFP) form comprising a mantissa for each coefficient and one set of exponents. The coefficients for each transform are grouped into subbands, and the mantissas for both transforms in a given subband share an exponent.

Because exponents are shared between a pair of transform blocks, a transient occurring at the end of block $B_3$, for example, can affect the quantization of all coefficients in transform blocks $DCT_2$ and $DST_3$. Pre-transient artifacts generated in the decoder may extend over an interval as long as 768 (or 512+256) samples or 16 msec. The signal samples within this interval, which is $1\frac{1}{2}$ signal sample blocks in length, is referred to herein as a "detection block." The pre-temporal masking interval of the human auditory system is normally on the order of 1 to 2 msec; therefore, pre-transient artifacts may be audible unless corrective steps are taken.

Detector 112 divides each detection block into twelve subblocks, $SB_1$ through $SB_{12}$, of 64 samples each. The duration of each subblock is approximately 1.3 msec which is commensurate with the pre-temporal masking interval. Each subblock is characterized by its peak amplitude $P_i$, where i is the number of the respective subblock. Other measures can be used to characterize the subblocks such as, for example, average amplitude of the two largest samples in the subblock or peak power level. In one embodiment, peak amplitude is used because it provides satisfactory results and can be obtained efficiently.

2. Transient Threshold

As noted above, the term "transient" refers to any abrupt change in signal characteristics which can cause the decoder to generate audible artifacts. The following is limited to a discussion of amplitude changes, however, because various types of transients can be converted into amplitude changes. For example, by using band-pass filters, a spectral component with an abrupt change in frequency across two or more of the passbands will appear as an abrupt change in amplitude within those passbands.

In one embodiment, transient detection comprises identifying abrupt changes in amplitude of the auxiliary signal which are sufficiently large. This is accomplished by comparing a transient threshold $T_T$ with changes between the peak amplitude of two adjacent subblocks in a detection block. Threshold $T_T$ may represent an absolute change in amplitude such as that represented in equation 4 or it may represent a relative increase in amplitude as shown in equation 5. Note that a transient detector according to either equation 4 or 5 detects only increases in amplitude; however, only minor changes in the equations are needed to allow the detector to detect decreases as well as increases in amplitude. In one embodiment, threshold $T_T$ represents a relative increase in amplitude of five times, or approximately 14 dB (20 $\log_{10} 5$).

$$(P_{i+1} - P_i) \geq T_T \quad (4)$$

$$\frac{P_{i+1}}{P_i} \geq T_T \qquad (5)$$

Two adjacent subblocks having peak amplitudes which change by an amount greater than or equal to threshold $T_T$ constitute a transient.

Subblock Selection

Selector 114 attempts to determine which subblocks recovered by the decoder will contain audible pre-transient artifacts and should be suppressed by the decoder. This is accomplished by comparing a small-amplitude threshold $T_A$ with the peak amplitude of subblocks near each detected transient.

Figure 4:
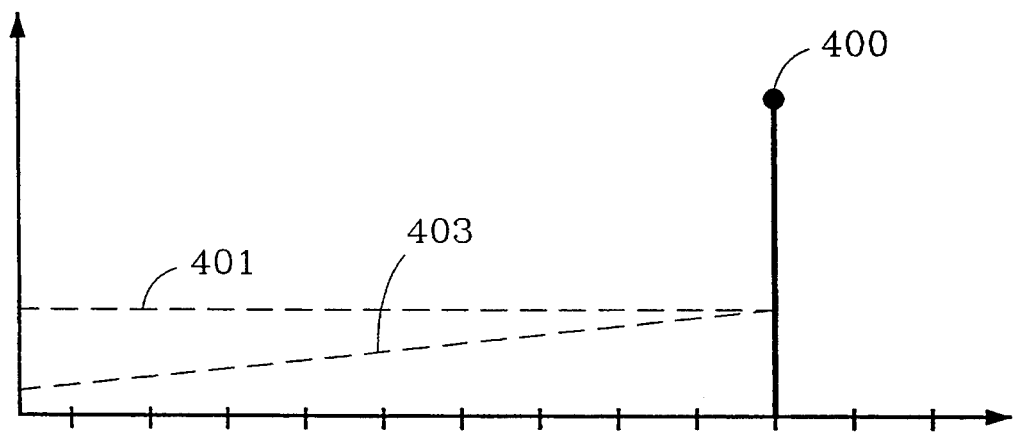
FIG. 4 is a hypothetical graphical representation of a transient amplitude and two transient threshold functions.

Threshold $T_A$ may be invariant or, for example, it may vary as a function of transient amplitude and/or distance from the transient. FIG. 4 illustrates a transient 400 occurring within a detection block. Broken line 401 represents an invariant threshold $T_A$. Broken line 403 represents threshold $T_A$, which varies as a function of distance from the transient. In one embodiment, threshold $T_A$ is similar to that represented by line 403. It varies as a function of distance and as a function of transient amplitude. It is equal to $-14$ dB at the transient and decreases at the rate of 3 dB per subblock width.

Selector 114 examines the peak amplitude of subblocks prior to each transient, starting with the last transient detected within a detection block, and proceeds backward until encountering either the beginning of the detection block or a subblock with a peak amplitude exceeding threshold $T_A$. All subblocks within this interval are marked for suppression.

Selector 114 reiterates this process for each remaining transient in the detection block. It is possible that a subblock marked for suppression on a previous iteration will be marked for suppression on a subsequent iteration. This is not significant because selector 114 generates an indication of which of the first eight subblocks were marked for suppression during any of the iterations.

An indication is generated for only the first eight subblocks because the last four subblocks will be examined again in a subsequent detection block. In this embodiment with shared exponents, the last four subblocks must be examined because transients occurring within those subblocks may have an effect upon the first eight subblocks.

Figure 5:
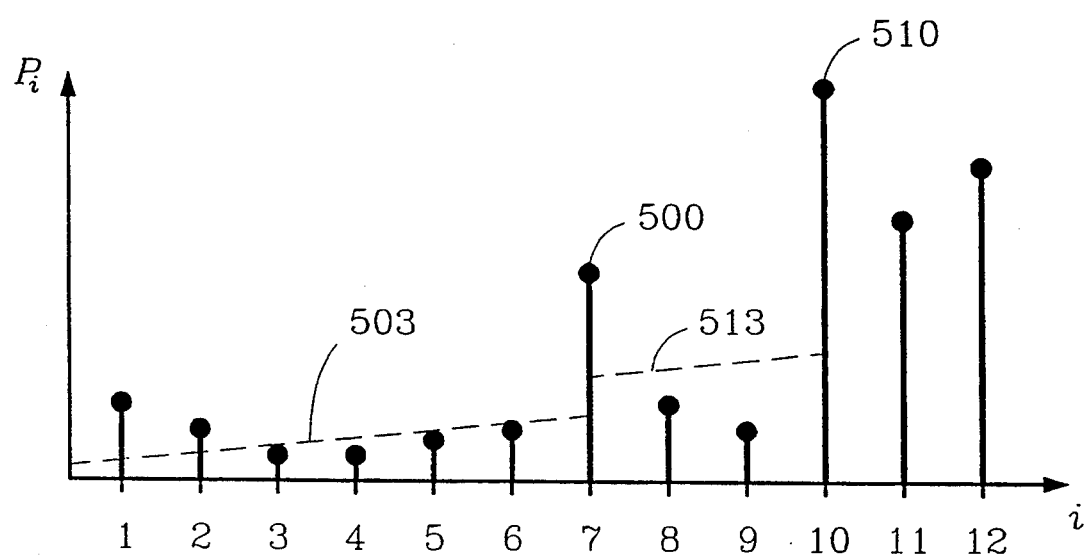
FIG. 5 is a hypothetical graphical representation of subblock peak amplitudes within a detection block and transient threshold functions.

An example of the results from this process may be seen by referring to FIG. 5. Each of the subblock peak amplitudes is represented. Starting from transient 510 in subblock $SB_{10}$, selector 114 determines that the peak amplitudes within subblocks $SB_9$ and $SB_8$ are below transient threshold 513. As a result, selector 114 marks subblocks $SB_8$ and $SB_9$ for suppression. Continuing with transient 500 in subblock $SB_7$, selector 114 determines that the peak amplitudes within the interval from $SB_6$ through $SB_3$ are below threshold 503 and marks subblocks $SB_3$ through $SB_6$ for suppression. Finally, selector 114 generates an indication that subblocks $SB_3$ to $SB_6$ and $SB_8$ are to be suppressed.

This indication may be binary, simply informing the decoder whether a subblock is to be suppressed, or the indication may convey a representation of subblock peak amplitude, allowing the decoder to decide which subblocks should be suppressed and by how much. Furthermore, the encoder may pass an indication to the decoder specifying by how much certain samples should be suppressed.

Many variations in this process are possible. Selector 114 may examine subblocks near only some of the detected transients such as, for example, the first transient, the largest-amplitude transient, or the three largest-amplitude transients.

Subblock Suppression

Suppressor 210 receives recovered time-domain sample blocks from inverse filterbank 206 and receives side information from path 209. In response to the side information, suppressor 210 determines which if any samples in the recovered sample blocks should be suppressed. Recovered signal samples may be suppressed using a variety of techniques.

In one embodiment, suppressor 210 receives a binary indication of which subblocks should be suppressed and merely sets to zero all samples in the indicated subblocks. This simple process may be modified by setting the samples in the indicated subblocks to some value other than zero. For example, the samples could be scaled by some factor such as 0.25 which reduces the amplitude by 12 dB.

For ease of explanation in the following discussion, words such as "suppressing a subblock" and the like shall refer to the notion that samples in a subblock are suppressed. Similarly, the terms "suppressed subblock" and "unsuppressed subblock" shall refer to subblocks having samples which are suppressed and to subblocks having samples which are not suppressed, respectively.

Squelch Filter

In high-quality coding applications, the simple suppression method described above is not adequate because it generates audible artifacts. In preferred embodiments, these artifacts are avoided or reduced by applying a squelch filter to the subblocks designated for suppression.

In one embodiment shown in FIG. 6, squelch filter 604 and delay 606 each receive from path 600 a block of recovered samples generated by an inverse filterbank. The samples processed by squelch filter 604 are passed along path 607 to one side of switch 602. The samples processed by delay 606 are passed along path 609 to the other side of switch 602. Switch 602 receives side information from path 601 indicating which of the eight subblocks of recovered samples are to be suppressed, and in response to the side information, switches between the filtered samples received from path 607 and the delayed samples received from path 609. The samples are passed by switch 602 along path 610.

Neither the specific technique used to implement squelch filter 604 nor the filter characteristics are critical to the practice of the invention. In one embodiment, the squelch filter is implemented by a two-pole low-pass IIR filter which provides a rolloff of 12 dB per octave above a cutoff frequency $f_s$ of 1.7 kHz. The difference equation and the equivalent transfer function for this filter are $$y_n = a_0 x_n + a_1 x_{n-1} + a_2 x_{n-2} - b_1 y_{n-1} - b_2 y_{n-2} \qquad (6)$$

$$H(z) = \left[ \frac{a_0 + a_1 z^{-1} + a_2 z^{-2}}{1 + b_1 z^{-1} + b_2 z^{-2}} \right] \qquad (7)$$

where the coefficients $a_i$ and $b_i$ are as follows:

| | |
|---|---|
| $a_0$ | 0.045033 |
| $a_1$ | 0.0 |
| $a_2$ | 0.0 |
| $b_1$ | −1.724633 |
| $b_2$ | 0.769665 |

Phase Delay

The IIR squelch filter described above introduces a frequency-dependent phase shift into the filtered output. Unless there is some compensation for this phase shift, step discontinuities are produced in the decoder output signal on path 610 every time squelch filter 604 is switched in or out. Delay 606 compensates for this phase shift by introducing a delay of five samples.

In many embodiments, it is not practical for delay 606 to approximate the phase shift of squelch filter 604 much beyond the cutoff frequency $f_s$; hence, step discontinuities must be accepted for frequencies above $f_s$ as squelch filter 604 is switched in and out. These discontinuities are more acceptable if the discontinuities are masked by other spectral components or if the spectral components above $f_s$ are small.

Discontinuities produced by switching out the squelch filter essentially coincide with transients and are likely to be masked.

Discontinuities produced by switching in the squelch filter occur at the beginning of an interval prior to a transient; therefore, the high-frequency components are known to be small above the cutoff frequency $f_1$ used in the encoder. By setting the squelch filter cutoff frequency $f_s$ approximately equal to the encoder cutoff frequency $f_1$, phase-shift discontinuities generated by switching in the squelch filter will generally be inaudible.

Step Filter

For preferred embodiments with phase shift compensation, switch 602 may be implemented as a cross-fade between filter path 607 and delay path 609. This function may be expressed as $$S_{out} = \alpha \cdot S_{filter} + (1-\alpha) \cdot S_{delay} \quad (8)$$

where
$S_{out}$ = output samples from switch 602,
$S_{filter}$ = samples along path 607 from squelch filter 604,
$S_{delay}$ = samples along path 609 from delay 606, and
$0 \leq \alpha \leq 1$.

In one embodiment, squelch filter 604 is switched in by fading coefficient $\alpha$ from zero to one over an interval at the end of an unsuppressed subblock which immediately precedes a suppressed subblock, and squelch filter 604 is switched out by fading coefficient $\alpha$ from one to zero at the end of a suppressed subblock which immediately precedes an unsuppressed subblock. A convenient implementation fades coefficient $\alpha$ linearly over an interval equal to the delay interval of delay 606.

In another embodiment, squelch filter 604 is switched in by fading coefficient $\alpha$ from zero to one over an interval at the beginning of the first subblock in a sequence of suppressed subblocks, and squelch filter 604 is switched out by fading coefficient $\alpha$ from one to zero over an interval at the end of the last subblock in a sequence of suppressed subblocks.

The specific function used to fade coefficient $\alpha$ may be chosen according to needs of a particular application and is not critical to the practice of the present invention.

As mentioned above, the specific embodiments discussed herein are set forth by way of example only and do not represent limitations upon the scope of the present invention.

We claim:

1. An encoder of an input signal comprising signal samples, said encoder comprising
   receiver means for receiving said signal samples and for generating an auxiliary signal in response thereto, said auxiliary signal comprising subblocks of one or more samples,
   detector means for detecting transients within said auxiliary signal,
   selection means for generating side information indicating the position of one or more of said subblocks in proximity to one or more of said transients,
   filter bank means for generating subband information in response to said signal samples,
   quantizer means for generating quantized information by quantizing said subband information, and
   formatter means for assembling said quantized information and said side information into a form suitable for transmission or storage.

2. An encoder according to claim 1 wherein said detector means compares a transient threshold to a difference between a measure of subblock amplitudes of a respective pair of said subblocks.

3. An encoder according to claim 2 wherein said measure of subblock amplitude is the amplitude of the largest magnitude sample in the respective subblock.

4. An encoder according to claim 2 wherein said transient threshold represents a change in amplitude substantially equal to 14 dB.

5. An encoder according to claim 1 or 2 wherein the length of said subblocks is commensurate to the pre-temporal psychoacoustic masking interval of the human auditory system.

6. An encoder according to claim 1 or 2 wherein said selection means generates side information indicating the position of one or more intervals, each interval comprising one or a plurality of adjoining subblocks immediately adjacent to a respective one of said one or more transients, wherein a measure of subblock amplitude of all subblocks within said interval do not exceed a small-amplitude threshold.

7. An encoder according to claim 6 wherein said measure of subblock amplitude is the amplitude of the largest magnitude sample in the respective subblock.

8. An encoder according to claim 6 wherein said small-amplitude threshold decreases as a function of distance from a respective transient.

9. An encoder according to claim 8 wherein the length of said subblocks is commensurate to the pre-temporal psychoacoustic masking interval of the human auditory system, and wherein said small-amplitude threshold decreases at a rate substantially equal to 3 dB across the length of each subblock.

10. An encoder according to claim 8 wherein the length of said subblocks is substantially equal to one millisecond, and wherein said small-amplitude threshold decreases at a rate substantially equal to 3 dB across the length of each subblock.

11. An encoder according to claim 6 wherein each of said intervals comprise one or more subblocks prior to a respective transient.

12. An encoder according to claim 1 or 2 wherein said receiver means generates said auxiliary signal by applying a filter to said signal samples.

13. An encoder according to claim 12 wherein said filter is a high-pass filter with a cutoff frequency substantially equal to 2 kHz.

14. An encoder according to claim 13 wherein said filter is a band-pass filter with a first cutoff frequency substantially equal to 2 kHz a second cutoff frequency substantially equal to 8 kHz.

15. A decoder of encoded information representing an input signal, said decoder comprising
    deformatter means for receiving said encoded signal and for extracting quantized information and side information therefrom, wherein said side information indicates one or more positions within said input signal,
    dequantizer means for dequantizing said quantized information into recovered subband information,
    inverse filter bank means for generating recovered signal samples in response to said recovered subband information, and
    suppressor means for generating an output signal in response to said recovered signal samples by suppressing selected ones of said recovered signal samples, said samples selected in response to said one or more positions indicated by said side information.

16. A decoder according to claim 15 wherein said suppressor means sets said selected samples to a predefined value.

17. A decoder according to claim 16 wherein said predefined value is zero.

18. A decoder according to claim 15 wherein said suppressor means reduces the amplitude of said selected samples by applying a scale factor.

19. A decoder according to claim 15 wherein said suppressor means applies a filter to said selected samples.

20. A decoder according to claim 15 wherein said suppressor means comprises
    means for passing said recovered signal samples through a filter and through a matching delay element in parallel with said filter, and
    switching means for generating said output signal by switching between the outputs of said filter and said delay element in response to said side information.

21. A decoder according to claim 20 wherein said switching means is a cross-fade between the outputs of said filter and said delay element.

22. An encoding method of an input signal comprising signal samples, said encoding method comprising
    receiving said signal samples and generating an auxiliary signal in response thereto, said auxiliary signal comprising subblocks of one or more samples,
    detecting transients within said auxiliary signal,
    generating side information indicating the position of one or more of said subblocks in proximity to one or more of said transients,
    generating subband information in response to said signal samples,
    generating quantized information by quantizing said subband information, and
    assembling said quantized information and said side information into a form suitable for transmission or storage.

23. A decoding method of encoded information representing an input signal, said decoding method comprising
    receiving said encoded signal and extracting quantized information and side information therefrom, wherein said side information indicates one or more positions within said input signal,
    dequantizing said quantized information into recovered subband information,
    generating recovered signal samples in response to said recovered subband information, and
    generating an output signal in response to said recovered signal samples by suppressing selected ones of said recovered signal samples, said samples selected in response to said one or more positions indicated by said side information.

* * * * *